M. C. Younglove,
Grain Drill.
Nº 20,603. Patented June 15, 1858.
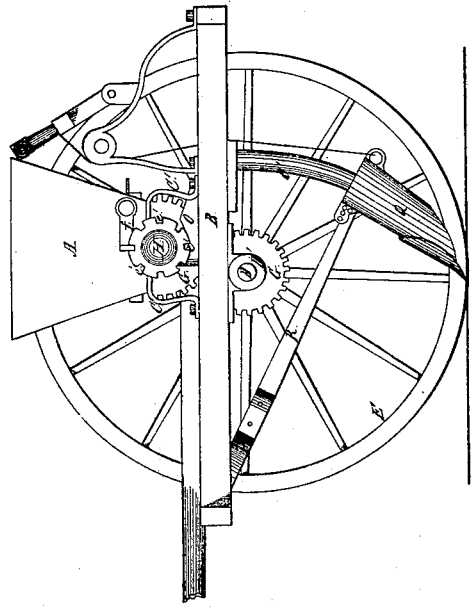
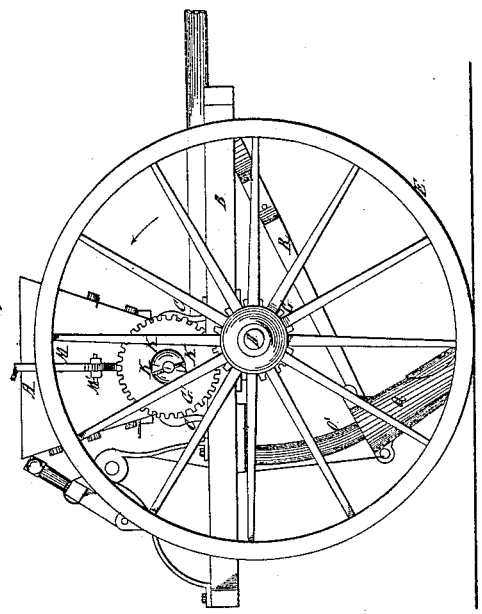
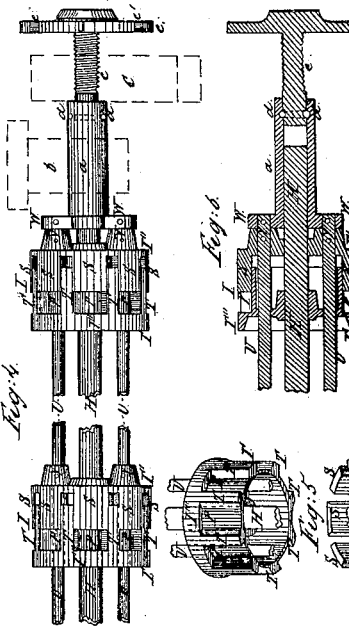
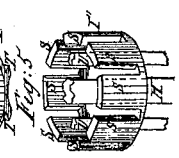
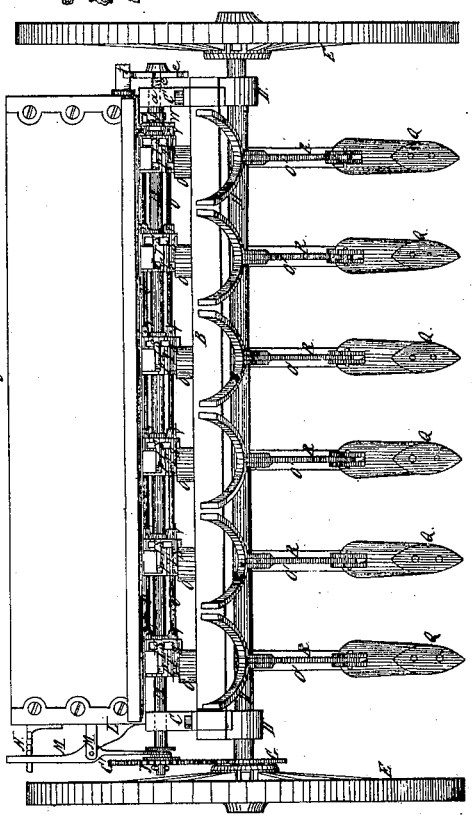

UNITED STATES PATENT OFFICE.

M. C. YOUNGLOVE, OF CLEVELAND, OHIO.

IMPROVEMENT IN SEED-DRILLS.

Specification forming part of Letters Patent No. 20,603, dated June 15, 1858.

*To all whom it may concern:*

Be it known that I, M. C. YOUNGLOVE, of Cleveland, in the county of Cuyahoga and State of Ohio, have invented certain new and useful Improvements in Seed-Drills; and I do hereby declare the following to be a full and complete description thereof, reference being had to the accompanying drawings, in which—

Figure 1 is a side elevation of my improved seed-drill; Fig. 2, a view of the opposite side of Fig. 1, with the wheel removed; Fig. 3, a rear view; and Figs. 4, 5, and 6, detached sections, which will be referred to in description.

Like letters refer to like parts in the several views.

The nature of my invention relates to the devices employed for gaging the quantity of seed to be sown, the manner of operating said devices, and the manner of throwing the seeding apparatus in and out of gear.

A represents the hopper or seed-box, which is mounted upon the frame B by means of a brace or bracket at each end, corresponding to C C', Figs. 1 and 2. By this means the hopper and frame are secured together. The frame may be constructed in any manner suitable for this purpose. The axle D is connected to the frame by the boxes or bearings D', in which the axle revolves. One of the driving-wheels, E, is permanently secured to the axle, while the other, E', Fig. 3, is so connected to it as to revolve independently of it.

Connected with the axle or wheel E is a driving-gear, G, which meshes into the gear G', which is on the shaft H of the seeding-cylinders I. The gear G' is allowed to slide upon the shaft H so that it may be thrown in and out of gear with the wheel G, and for the purpose of rotating the shaft H and cylinders I a pin or key, J, is inserted in the shaft, which fits a clutch or cam K in the wheel G'. This clutch is formed with two inclined faces or planes, each terminating with a depression or notch at K' K', Fig. 1, forming two radial lines between the cam by the action of the spring L and lever M, Fig. 3. The gear G' is continually being pressed against the pin J, and when the driving-wheel E revolves in the direction of r w, Fig. 1, the gear G' turns so that the inclined faces of the cam only are presented to the pin J, which allows both the driving-wheel and gears G G' to turn in that direction without moving or disturbing the shaft H and seed-cylinders I; but when the driving-wheel E turns in a reverse direction to the arrow the gear G' turns correspondingly, so that the shoulders or notches K' K' are brought in direct contact with the pin J by the action of the aforesaid spring and lever, and by this intervention of the pin J and cam the shaft H and seeding-cylinders I are revolved in the proper direction for receiving seed from the hopper for sowing. No seed is sown when the machine is backing or turning, so that the driving-wheels revolve in the direction of the arrow.

On the inside of the wheel G' is connected a hub with a groove, to which is fitted the lower end of the lever M. By means of this lever the gearing are connected and disconnected. The lever M has its fulcrum at M', and is held in place by the notched arm N, by which the gearing is held in its desired position when out of gear and held in gear in connection with the spring, as the case may be, so that the machine may be transported from one place to another without disturbing the seed-cylinders or discharging seed from the hopper.

The openings from the hopper to the seed-cylinders may be made in the ordinary manner and provided with the usual slides to cut off the grain from the cylinders. The seed-cylinders are placed under the hopper in direct communication with the seed-openings through which passes the grain from the hopper to the cups P, Figs. 4 and 5, in the cylinders. From the cups it drops into the chutes O, then through the tubes O' to the ground.

The spouts Q are connected to the frame by the drag-bars R in the usual manner, and the spouts are raised and lowered to and from the ground by the ordinary means.

The seed-cylinders I are each divided into two sections, I' and I'', Fig. 5. The section I' has an interior opening or space to avoid weight of metal in the machine for obvious reasons. The section I'' has also an interior space surrounded by fingers or projections S, with intervening spaces. The section I'' slips onto the section I' in such a way that the projections S pass into the spaces P, which form the seed-cups, and the ribs T slide into the spaces between the projections S. Thus the projections or fingers S correspond with the seed-cups P, and the ribs T, which divide the seed-cups, correspond with the spaces between the projections S, the sides or walls of the cups being formed by the ribs T, the ends of the projections S, and the inside of the rim I'''. The section I' is firmly keyed to the shaft H, but the section I'' is so fitted to the shaft as to slide upon it, by which means the capacity of the cup P may be increased or diminished, according to the quantity of seed to be sown; and for the purpose of insuring instant uniformity in the capacity of the cups the sections I'' are all connected together by the rods U U, Figs. 3 and 4. These rods pass loosely through the sections I', but are pinned or otherwise secured to the sliding sections I'' at V V, Figs. 4 and 6, where there are hubs or projections through which and the rods the pins at V pass, thereby connecting the rods U U and sections I'' all together. These rods extend from one extreme seed-cylinder to the other, and are equidistant from the center of the cylinders or shaft H and in a central line with each other, the centers of the two rods and shaft being in the same plane. The ends of the rods are attached respectively to the last of the sections I'' in the same manner as the other sections. The opposite ends of the rods are fastened to the yoke or stirrup W, Figs. 3, 4, and 6. The stirrup forms a part of the sleeve $a$, which extends from it, and which receives the end of the shaft H, Fig. 6. The other end of the shaft is supported by a journal box or bearing in the brace C, Fig. 3, and the sleeve $a$ is supported by the pendent bearing or box $b$, in which the sleeve revolves. Thus the shaft H has suitable bearings and supports at each end below the hopper. At the end of the sliding sleeve $a$ is attached a screw, $c$, which works in a corresponding thread in the brace C', and is connected to the sleeve by two pins, $d$, Figs. 4 and 6. These pins pass through the sides of the sleeve, and fit into corresponding grooves in the end of the screw. At the intersection of the pins this groove encircles the end of the screw, which allows the sleeve to revolve without moving the screw, while by the intervention of the pins $d$ the sleeve and its immediate connections can be moved laterally by turning the screw, whether the machine be in action or at rest. The action of the screw is directly transmitted to all the sections I'' at the same time as the rods U U, to which the sections I'' are all attached, which rods are pinned to the yoke W, forming a part of the sleeve, as before described. Thus by turning the screw $c$ all the sections I'' are caused simultaneously to slide laterally upon the shaft H and sections I', whereby the capacity of the cups is increased or diminished, according to the quantity of seed desired to be sown. At the end of the screw is fastened a hand-wheel, $e$, to facilitate the movements of the screw, &c. In the periphery of this wheel are a series of notches, $e'$, Fig. 2, into which is slipped the catch $f$, by which the screw is retained in place, and the capacity of the cups unchanged. The shaft H, with the seed-cylinders, and rods U U revolve together with the yoke W and sleeve $a$, which sleeve is supported by the box or bearing $b$, and by which means the end of the shaft is sustained which enters the sleeve, so as to allow the sleeve to slide upon it and in the box $b$ in gaging the capacity of the cups, thus combining with the sliding sleeve the functions of a sliding journal and a receptacle for the shaft H.

In my machine it is easy to gage the amount of seed to be sown per acre. The adjusting-screw $c$ is very accessible, so that the size of the seed-cups can be changed without stopping the team, as is often requisite with other machines. A single motion of the screw $c$ adjusts all the seed-cups at the same moment and to the same extent. On account of the sleeve-journal $a$ (which is connected with the screw $c$ and the axle H) it is impossible for the capacity of the seed-cups to be changed by the resistance of the seed, or even of a stone or other obstruction passing from the hopper to the seed-cups. Neither can such change be produced by the moving of the screw $c$, caused by the constant jarring of the machine in working, even after the screw $c$ has worn loose. Other similar machines, on the contrary, are liable to have the size of the seed-cups changed without the knowledge of the attendant, consequently sowing either too much seed or not enough, unless the machine be constantly watched.

I am aware that individual seed-cups and separate seed-cylinders somewhat like mine have been adjusted by a spring and screw; but this arrangement is complicated, expensive, and inconvenient, and as each cylinder has to be set separately there is no certainty of uniformity in the setting of the cups of the cylinders. Consequently one cylinder may be sowing more or less seed than the others.

I am also aware that grooved cylinders for sowing in drills have been connected by rods; but my machine is distinguished from these and from all others by the connected series of compound pocketed cylinders operated by the single screw $c$, in connection with the sliding sleeve-journal $a$, by which means the series of cupped cylinders is uniformly and simultaneously increased or diminished, as may be required, whether the machine is at work or at rest.

The sleeve $a$ constitutes a sliding sleeve and journal and a receptacle and support for the end of the shaft H, and also a medium by which the action of the screw $c$ is transmitted to the series of cupped cylinders.

Having thus fully described my invention, what I claim, and desire to secure by Letters Patent of the United States, is—

The connected series of compound pocketed seed-cylinders I, in combination with the sliding sleeve-journal $a$ and the adjusting-screw $c$, the whole being arranged and operated substantially as set forth.

M. C. YOUNGLOVE.

Witnesses:
I. BRAINERD,
W. H. BURRIDGE.